(12) United States Patent
Satat

(10) Patent No.: US 12,482,247 B2
(45) Date of Patent: Nov. 25, 2025

(54) RAW SENSOR DATA FUSION BETWEEN A CAMERA SENSOR AND A DEPTH SENSOR

(71) Applicant: GM Cruise Holdings LLC, San Francisco, CA (US)

(72) Inventor: Guy Satat, Natick, MA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 175 days.

(21) Appl. No.: 18/466,768

(22) Filed: Sep. 13, 2023

(65) Prior Publication Data

US 2025/0086950 A1    Mar. 13, 2025

(51) Int. Cl.
| | | |
|---|---|---|
| G06V 20/58 | (2022.01) |
| G06T 5/60 | (2024.01) |
| G06T 7/55 | (2017.01) |
| G06V 10/80 | (2022.01) |
| G06V 10/82 | (2022.01) |

(52) U.S. Cl.
CPC ............. *G06V 10/803* (2022.01); *G06T 7/55* (2017.01); *G06V 10/82* (2022.01); *G06V 20/58* (2022.01); *G06T 2207/10028* (2013.01); *G06T 2207/20084* (2013.01); *G06T 2207/20221* (2013.01); *G06T 2207/30252* (2013.01)

(58) Field of Classification Search
CPC ............... G06V 10/82; G06V 20/56; G01S 13/86–867; G06T 2207/30252
See application file for complete search history.

(56) References Cited

U.S. PATENT DOCUMENTS

| | | | |
|---|---|---|---|
| 11,250,637 B1* | 2/2022 | Tan | G06N 5/04 |
| 11,256,988 B1* | 2/2022 | Guerci | G06N 3/08 |
| 12,354,371 B1* | 7/2025 | Cheng | G01S 17/86 |
| 2019/0004533 A1* | 1/2019 | Huang | G01S 17/86 |
| 2019/0236955 A1* | 8/2019 | Hu | G08G 1/096741 |
| 2020/0074661 A1* | 3/2020 | Anisimovskiy | G06T 3/02 |
| 2021/0103755 A1* | 4/2021 | Hotson | G01S 13/865 |
| 2022/0261590 A1* | 8/2022 | Brahma | G06V 20/56 |
| 2023/0071437 A1* | 3/2023 | Kim | G01S 17/89 |
| 2023/0260298 A1* | 8/2023 | Widjaja | G01S 17/931 |
| 2025/0189663 A1* | 6/2025 | Kim | G01S 17/931 |

* cited by examiner

*Primary Examiner* — Frank Johnson
(74) *Attorney, Agent, or Firm* — CANTOR COLBURN LLP

(57) ABSTRACT

Systems and techniques are provided for fusing raw sensor data captured by a camera sensor and one or more depth sensors to generate a dense depth map. An example process includes receiving raw camera data captured by a camera sensor and descriptive of a scene, receiving raw depth data captured by one or more depth-sensing sensors and descriptive of the scene, and providing the raw camera data and the raw depth data to a neural network, which is configured to fuse the raw camera data and the raw depth data. The example process can further include generating a depth map of the scene based on the fusion of the raw camera data and the raw depth data.

16 Claims, 6 Drawing Sheets

RAW SENSOR DATA FUSION BETWEEN A CAMERA SENSOR AND A DEPTH SENSOR

BACKGROUND

1. Technical Field

The present disclosure generally relates to a sensor system of an autonomous vehicle. For example, aspects of the present disclosure relate to techniques and systems for fusing raw sensor data captured by a camera sensor and one or more depth sensors to generate a dense depth map.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements for operations such as perception, planning, control, prediction, etc.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
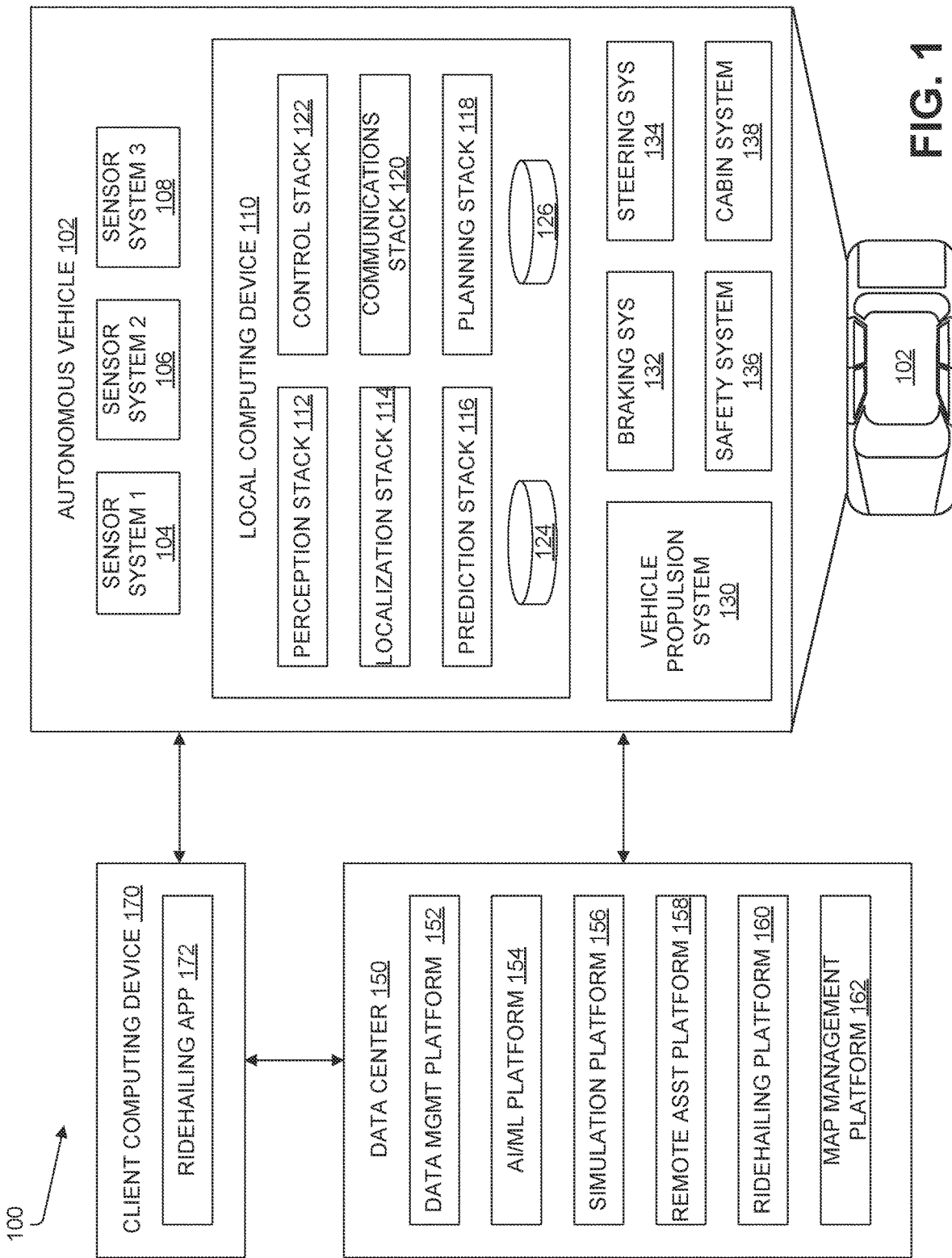
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

As previously described, sensors are commonly integrated into a wide array of systems and electronic devices. AVs can use the sensors to collect sensor data that the AVs can use for operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc.

An image sensor can be used to obtain sensor data that measures, describes, and/or depicts one or more aspects of a target such as an object. For example, one or more camera sensor(s) can be mounted on an AV, and image frames generated by the camera sensor(s) can be processed by the AV's computing system to enable the AV to "see" its environment and subsequently make decisions on how to operate and proceed. For example, a perception stack can detect and classify objects detected by the camera sensor(s) and determine the current location, speed, directions, and the like of the objects in the scene.

Camera sensors can also be used to determine depth information related to objects detected within image frames captured by the camera sensor(s). For example, each pixel of an image frame captured by a camera sensor can have a depth value associated with it indicating the distance that the object associated with that pixel is located from the camera sensor. AVs can be equipped with additional depth sensor(s) such as a LIDAR sensor, a RADAR sensor, a time-of-flight (TOF) camera, an ultrasonic sensor, and so on. A combination of different sensors can be used to help AVs understand the environment and make informed decisions.

Systems, apparatuses, processes (also referred to as methods), and computer-readable media (collectively referred to as "systems and techniques" or "system") are described herein for fusing raw sensor data captured by a camera sensor and one or more depth sensors. For example, the systems and techniques can receive raw/unprocessed camera data (e.g., RGB image data (monocular and/or stereo), etc.) that is captured by a camera sensor and raw/unprocessed depth data that is captured by one or more depth sensors (e.g., an ultrasonic sensor, a RADAR sensor, an indirect ToF camera, a direct ToF LIDAR sensor, a camera-based depth sensing sensor such as monocular depth estimation and/or stereo depth estimation, etc.). Both raw camera data and raw depth data can be provided to a neural network, which is trained to fuse the raw camera data and the raw depth data.

In some examples, the systems and techniques of the disclosed technology can generate a dense depth map based on the raw sensor data fusion between raw camera image data captured by a camera sensor and raw depth data captured by additional depth sensor(s). Such dense depth map can have a resolution that is comparable or superior to the resolution of the camera image data. In some instances, a dense depth map that is generated based on the raw sensor data fusion can be provided to a perception system of an AV (e.g., an object detector, etc.) to detector an object in the scene and/or estimate a free space in the scene.

Aspects of the disclosed technology can improve a perception system of an AV (e.g., object detection, event detection, tracking, image processing, etc.) based on improved depth measurements from raw sensor data fusion. A combination of data captured by a camera sensor and one or more depth sensors can create a robust perception system with a dense depth map, providing robustness, redundancy, and confidence in sensor measurements.

Various examples of the systems and techniques for fusing raw sensor data captured by a camera sensor and one or more depth sensors to generate a dense depth map are illustrated in FIG. 1 through FIG. 6 and described below.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 (e.g., client application) to enable passengers to view the AV 102 in transit en route to a pick-up or drop-off location, and so on.

While the AV 102, the local computing device 110, and the AV environment 100 are shown to include certain systems and components, one of ordinary skill will appreciate that the AV 102, the local computing device 110, and/or the AV environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
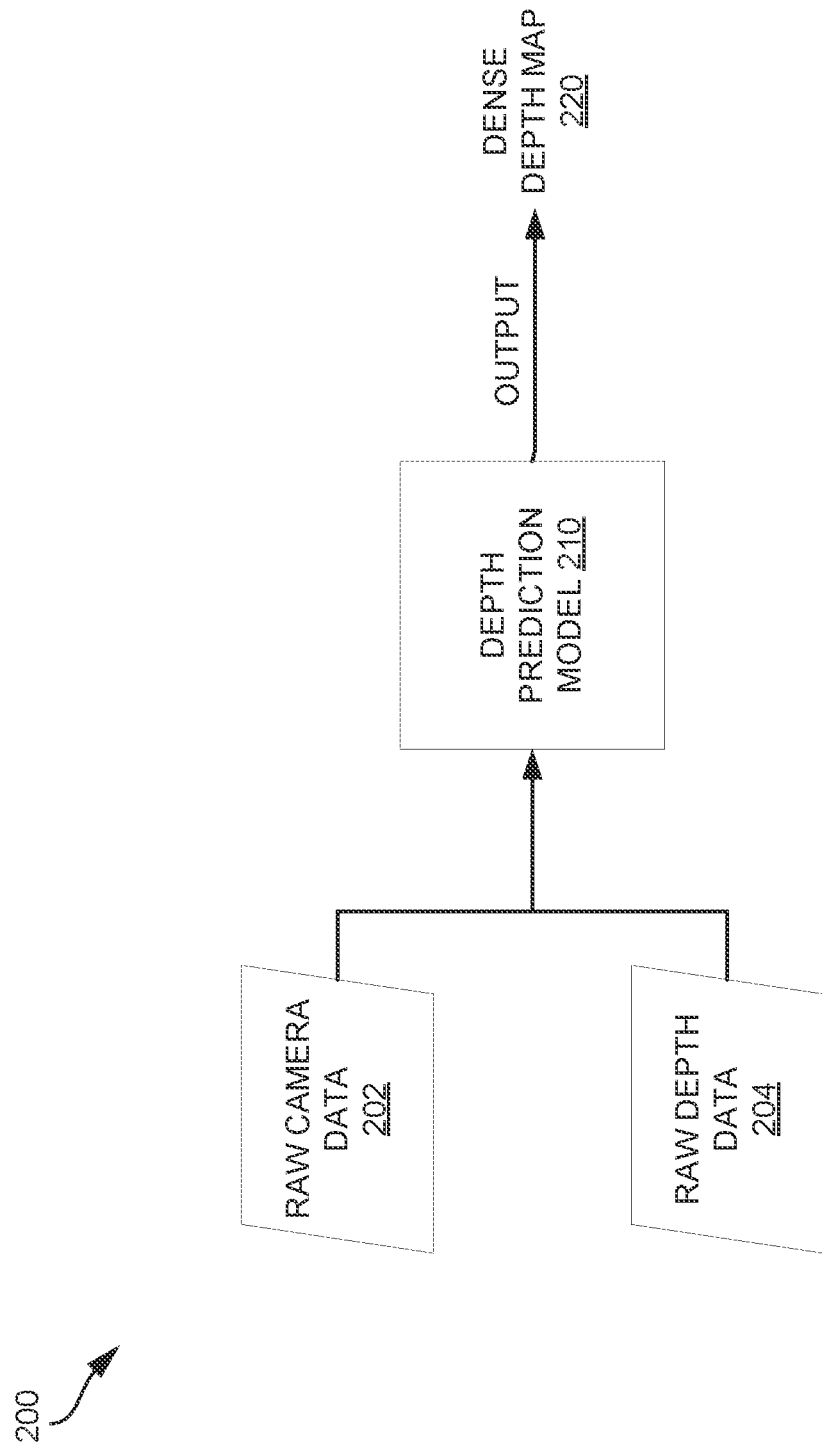
FIG. 2 is a diagram illustrating an example system for fusing raw sensor data captured by a camera sensor and one or more depth sensors, according to some examples of the present disclosure.

FIG. 2 illustrates an example system 200 for fusing raw sensor data captured by a camera sensor and one or more depth sensors. As shown, system 200 includes depth prediction model 210 that receives raw camera data 202 and raw depth data 204 and outputs dense depth map 220.

In some examples, raw camera data 202 (e.g., RGB image, monocular image data or stereo image data) may be captured/collected by a camera sensor, which may be used as part of sensor systems 104-108 of AV 102 as illustrated in FIG. 1. Each pixel in the image of raw camera data may have depth information in a scene.

In some examples, raw depth data 204 may be captured/collected by one or more depth sensors, which may be used as part of sensor systems 104-108 of AV 102 as illustrated in FIG. 1. Non-limiting examples of depth sensors that can be used to capture raw depth data 204 can include an ultrasonic sensor, a near-field radar sensor, and a ToF camera sensor. In some instances, raw depth data 204 has a resolution (or measurement density) that is lower than a resolution (or measurement density) of raw camera data 202. In some cases, raw depth data 204 may have smaller but sparse pixels compared to raw camera data 202.

In some aspects, depth prediction model 210 may receive raw camera data 202 and raw depth data 204 prior to any processing of the raw camera data 202 and raw depth data 204 such as object detections, labeling, classifying, and so on. As follows, depth prediction model 210 may provide raw camera data 202 and raw depth data 204 to a neural network, which is configured to fuse raw camera data 202 and raw depth data 204. For example, depth prediction model 210 may include one or more machine learning algorithms, which are trained to fuse raw camera data 202 and raw depth data 204 and generate dense depth map 220. In some examples, dense depth map 220 may have a resolution that is comparable to or superior to the resolution of raw camera data 202.

In some examples, if a vehicle (e.g., AV 102) is moving when raw camera data 202 and/or raw depth data 204 is captured, sensors may have to be temporarily registered. Give the vector of motion of the vehicle and timestamps for the sensor measurements, the depth data can be translated based on the timestamps and motion vector between them.

In some examples, depth prediction model 210 may receive raw depth data 204 that is projected onto raw camera data 202 for depth prediction. For example, each point that is captured by one or more depth sensors (e.g., an ultrasonic sensor, a near-field radar sensor, an indirect ToF camera sensor, etc.) can be projected onto corresponding camera image frame of raw camera data 202. The depth prediction model 210 consumes the RGB and depth data (e.g., raw depth data 204 that is projected onto raw camera data 202) to produce dense depth map 222.

In some aspects, the neural network can include a Siamese network that has at least two subnetworks. Details of the Siamese network for the raw sensor data fusion and generating a dense depth map are provided below with respect to FIG. 3.

In some cases, depth prediction model 210 may identify an inconsistency between raw camera data 202 and raw depth data 204. As follows, depth prediction model 210 may determine which sensor data to be used to generate dense depth map 220 for any inconsistent portion based on one or more factors such as weather, time of day, light intensity, etc. For example, if raw camera data 202 and raw depth data 204 are captured in nighttime, depth prediction model 210 may assign higher weight on raw depth data 204 that is captured by an ultrasonic sensor and lower weight on raw camera data 202 that is captured by a camera sensor for any inconsistency between raw camera data 202 and raw depth data 204 in generating dense depth map 220.

Figure 3:
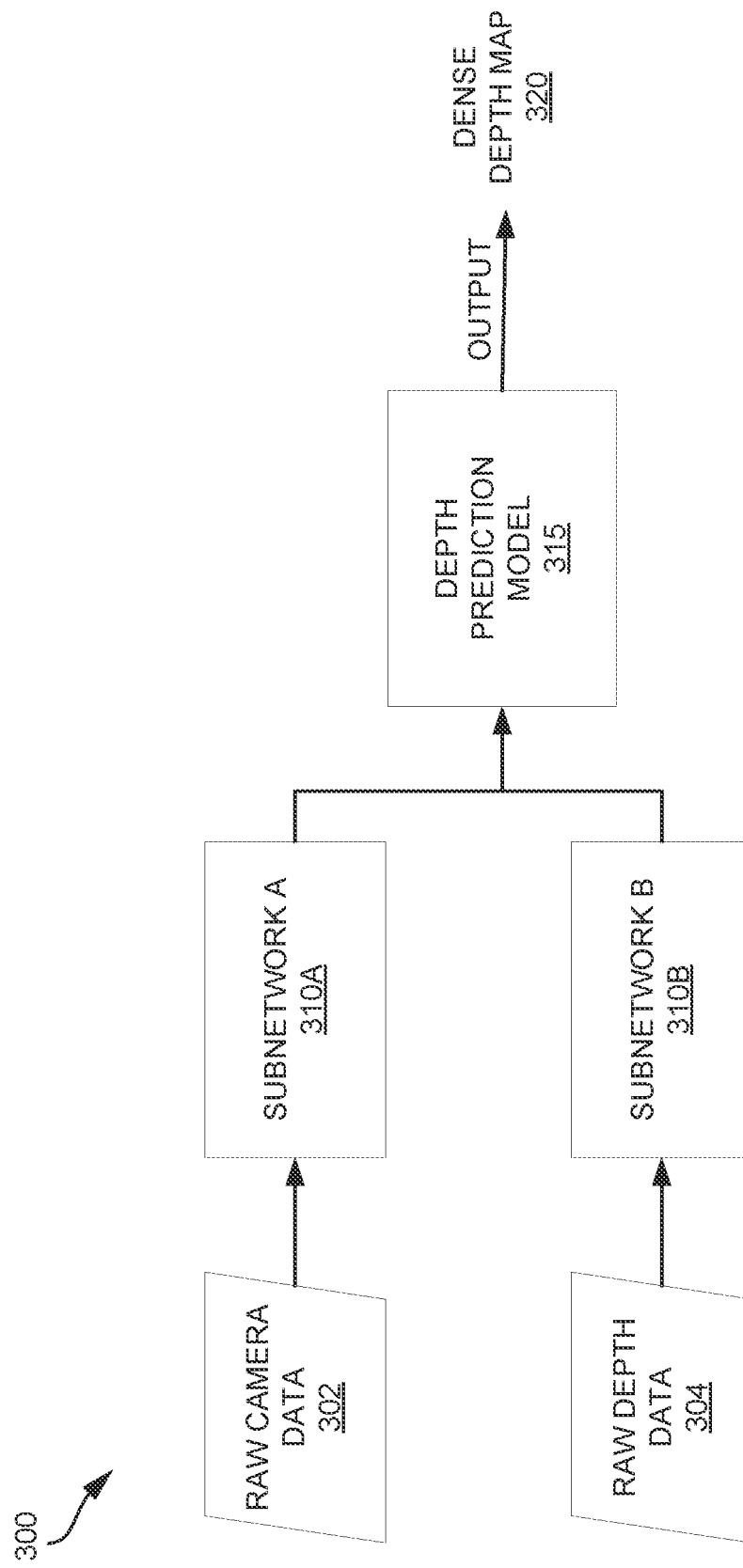
FIG. 3 is a diagram illustrating an example network architecture for fusing raw sensor data captured by a camera sensor and depth sensor(s), according to some examples of the present disclosure.

FIG. 3 is a diagram illustrating an example network architecture 300 for fusing raw sensor data captured by a camera sensor and depth sensor(s). The example network architecture 300 may include a Siamese neural network, which contains two or more subnetworks (e.g., subnetwork A 310A and subnetwork B 310B) that are trained to output dense depth map 320 (similar to dense depth map 220 as illustrated in FIG. 2).

As shown, subnetwork A 310A may receive raw camera data 302 (similar to raw camera data 202 as illustrated in FIG. 2) and subnetwork B 310B may receive raw depth data 304 (similar to raw depth data 204 as illustrated in FIG. 2). In some examples, subnetwork A 310A and subnetwork B 310B can be trained by a loss function such as triplet loss or contrastive loss.

In some examples, the subnetwork A 310A and subnetwork B 310B, upon receiving raw camera data 302 and raw depth data 304, respectively, feed them to depth prediction model 315 (similar to depth prediction model 210 as illustrated in FIG. 2), which is configured to generate dense depth map 320.

Figure 4:
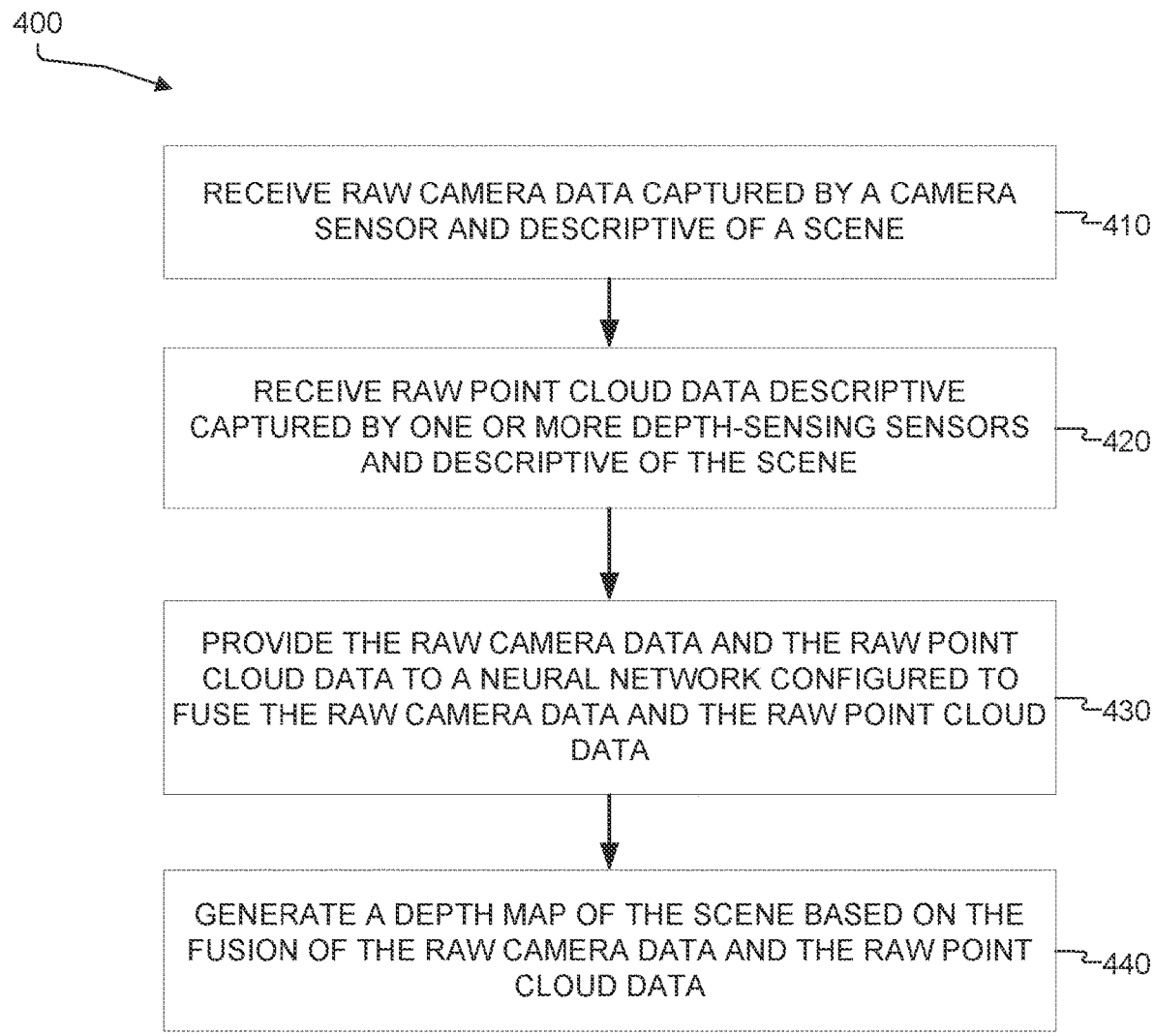
FIG. 4 is a flowchart illustrating an example process for fusing raw sensor data captured by a camera sensor and one or more depth sensors, according to some examples of the present disclosure.

FIG. 4 is a flowchart illustrating an example process 400 for fusing raw sensor data captured by a camera sensor and one or more depth sensors to generate a dense depth map. Although the example process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At block 410, process 400 includes receiving raw camera data captured by a camera sensor, wherein the raw camera data is descriptive of a scene. For example, depth prediction model 210 can receive raw camera data 202, which is captured by a camera sensor (e.g., sensor systems 104-108 of AV 102). The raw camera data 202 is unprocessed data in which object detection, labeling, or classification has not been performed.

At block 420, process 400 includes receiving raw depth data captured by one or more depth-sensing sensors, wherein the raw depth data is descriptive of the scene. For example, depth prediction model 210 can receive raw depth data 204, which is captured by one or more depth sensors (e.g., sensor systems 104-108 of AV 102) such as an ultrasonic sensor, a near-field radar sensor, a ToF camera sensor, and so on. The raw depth data 204 is unprocessed data in which object detection, labeling, or classification has not been performed.

At block 430, process 400 includes providing the raw camera data and the raw depth data to a neural network, which is configured to fuse the raw camera data and the raw depth data. For example, depth prediction model 210 may include one or more machine learning algorithms, which may be configured to fuse raw camera data 202 and raw depth data 204.

At block 440, process 400 includes generating a depth map of the scene based on the fusion of the raw camera data and the raw depth data. For example, depth prediction model 210 can generate dense depth map 220 based on the fusion of raw camera data 202 and raw depth data 204. In some aspects, depth prediction model 210 can benefit from the semantic information of raw camera data 202 and the geometric information of raw depth data 204 to produce dense depth map 220.

In some examples, raw depth data 204 has a resolution that is lower than the resolution of raw camera data 202. In some instances, dense depth map 220 may have a resolution that is comparable to or superior to the resolution of raw camera data 202.

In some examples, process 400 can include providing a dense depth map that is generated by fusing raw camera data and raw depth data to a computing system associated with an AV (e.g., local computing device 110 such as perception stack 112, prediction stack 116, planning stack 118, etc.). For example, perception stack 112 may receive dense depth map 220 and detect an object in a scene. In some examples, perception stack 112 may estimate a free space in a scene based on dense depth map 220.

Figure 5:
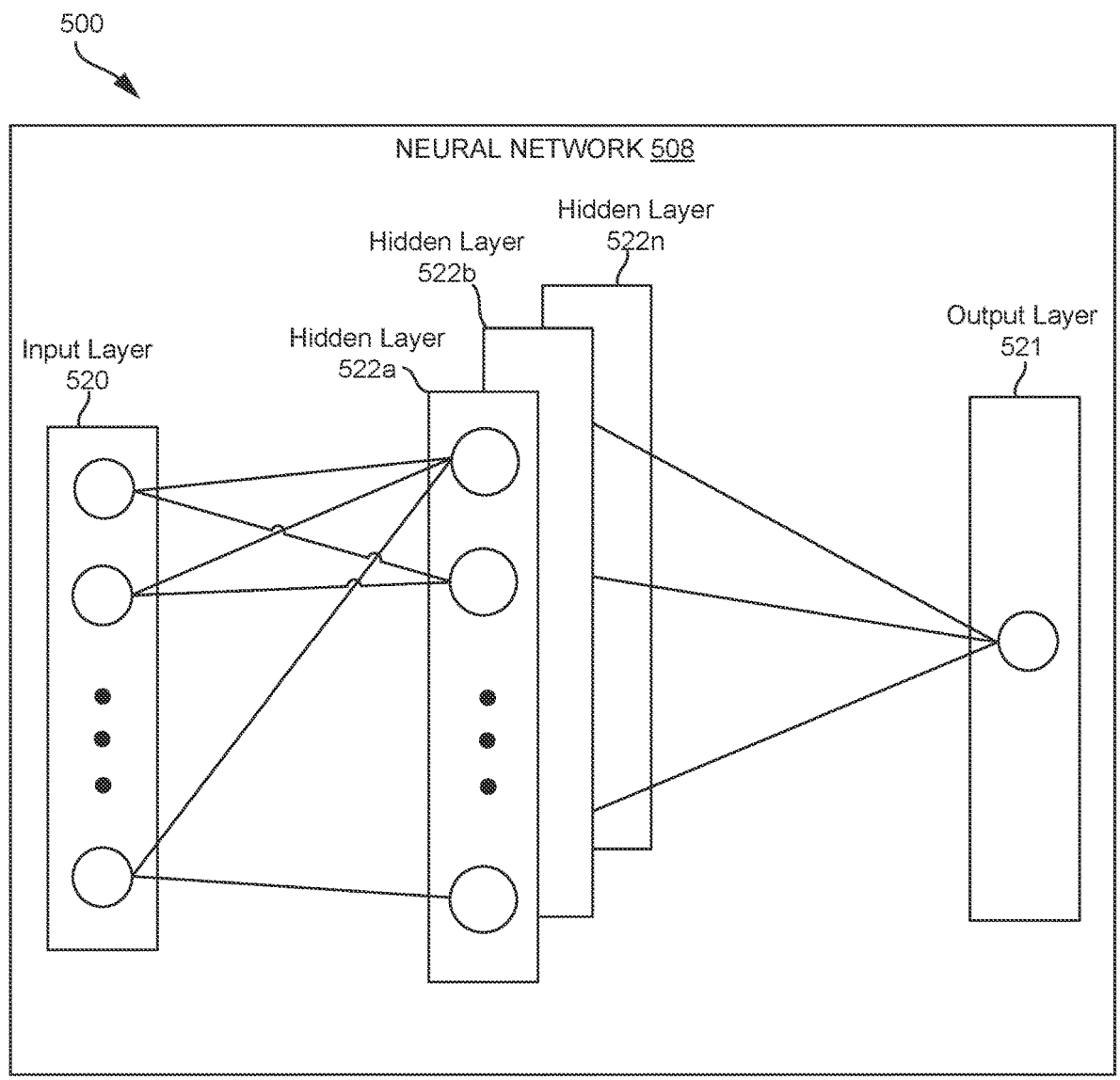
FIG. 5 is a diagram illustrating an example configuration of a neural network model that can be used to implement a radar interference controller, according to some examples of the present disclosure.

FIG. 5 illustrates an example neural network 508 that can be used to implement all or a portion of the systems and techniques described herein (e.g., neural network 500 can be used to implement depth prediction model 210, as discussed above). The example neural network 500 is merely one illustrative example provided for clarity and explanation purposes. One of ordinary skill in the art will recognize that other configurations of a neural network are also possible and contemplated herein.

An input layer 520 can be configured to receive sensor data and/or data relating to an environment surrounding an AV. Neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. Neural network 500 further includes an output layer 521 that provides an output resulting from the processing performed by the hidden layers 522a, 522b, through 522n.

Neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(½(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
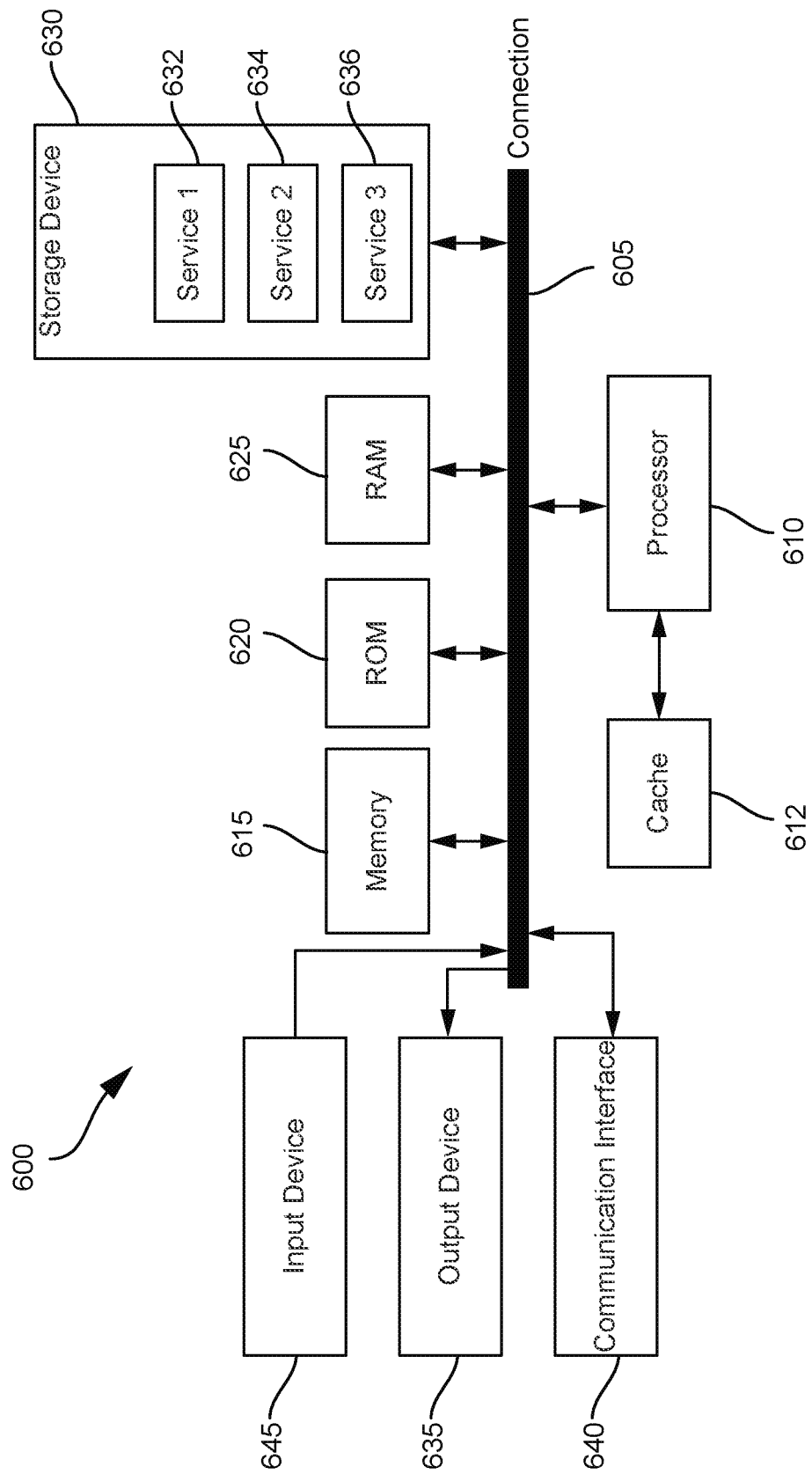
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up local computing device 110, client computing device 170, a passenger device executing the ride-hailing application 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communication interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some examples, a hardware service that performs a particular function can include the software component stored in a computer-readable medium in connection with the necessary hardware components, such as processor 610, connection 605, output device 635, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: receive raw camera data captured by a camera sensor, wherein the raw camera data is descriptive of a scene; receive raw depth data captured by one or more depth-sensing sensors, wherein the raw depth data is descriptive of the scene; provide the raw camera data and the raw depth data to a neural network, which is configured to fuse the raw camera data and the raw depth data; and generate a depth map of the scene based on the fusion of the raw camera data and the raw depth data.

Aspect 2. The system of Aspect 1, wherein the raw camera data has a first resolution, the raw depth data has a second resolution that is lower than the first resolution, and the depth map has a third resolution that is at or above the first resolution.

Aspect 3. The system of Aspects 1 or 2, wherein the one or more depth-sensing sensors include at least one of an ultrasonic sensor, a radio detection and ranging (RADAR) sensor, and an indirect time-of-flight (ToF) camera sensor.

Aspect 4. The system of any of Aspects 1 to 3, wherein providing the raw camera data and the raw depth data to the neural network includes: projecting the raw depth data onto the raw camera data.

Aspect 5. The system of any of Aspects 1 to 4, wherein the neural network is a Siamese neural network, wherein a first subnetwork receives the raw camera data and a second subnetwork receives the raw depth data.

Aspect 6. The system of any of Aspects 1 to 5, wherein the one or more processors are configured to: provide the depth map to a detector, which is configured to detect an object in the scene.

Aspect 7. The system of any of Aspects 1 to 6, wherein the one or more processors are configured to: provide the depth map to a perception stack, which is configured to estimate a free space in the scene.

Aspect 8. The system of any of Aspects 1 to 7, wherein the camera sensor and the one or more depth-sensing sensors are mounted on an autonomous vehicle.

Aspect 9. A method comprising: receiving raw camera data captured by a camera sensor, wherein the raw camera data is descriptive of a scene; receiving raw depth data captured by one or more depth-sensing sensors, wherein the raw depth data is descriptive of the scene; providing the raw camera data and the raw depth data to a neural network, which is configured to fuse the raw camera data and the raw depth data; and generating a depth map of the scene based on the fusion of the raw camera data and the raw depth data.

Aspect 10. The method of Aspect 9, wherein the raw camera data has a first resolution, the raw depth data has a second resolution that is lower than the first resolution, and the depth map has a third resolution that is at or above the first resolution.

Aspect 11. The method of Aspects 9 or 10, wherein the one or more depth-sensing sensors include at least one of an ultrasonic sensor, a radio detection and ranging (RADAR) sensor, and an indirect time-of-flight (ToF) camera sensor.

Aspect 12. The method of any of Aspects 9 to 11, wherein providing the raw camera data and the raw depth data to the neural network includes: projecting the raw depth data onto the raw camera data.

Aspect 13. The method of any of Aspects 9 to 12, wherein the neural network is a Siamese neural network, wherein a first subnetwork receives the raw camera data and a second subnetwork receives the raw depth data.

Aspect 14. The method of any of Aspects 9 to 13, further comprising: providing the depth map to a detector, which is configured to detect an object in the scene.

Aspect 15. The method of any of Aspects 9 to 14, further comprising: providing the depth map to a perception stack, which is configured to estimate a free space in the scene.

Aspect 16. The method of any of Aspects 9 to 15, wherein the camera sensor and the one or more depth-sensing sensors are mounted on an autonomous vehicle.

Aspect 17. A non-transitory computer-readable medium comprising instructions which, when executed by one or more processors, cause the one or more processors to perform a method according to any of Aspects 9 to 16.

Aspect 18. A system comprising means for performing a method according to any of Aspects 9 to 16.

Aspect 19. The system of Aspect 18, wherein the system comprises an autonomous vehicle.

Aspect 20. A computer-program product including instructions which, when executed by one or more processors, cause the one or more processors to perform a method according to any of Aspects 9 to 16.

What is claimed is:

1. A sensor fusion system of a vehicle comprising:
one or more camera sensors and one or more depth-sensing sensors;
a perception stack;
a memory; and
one or more processors coupled to the memory, the one or more processors being configured to:
receive unprocessed raw camera data captured by the one or more camera sensors, wherein the unprocessed raw camera data is descriptive of a scene;
receive unprocessed raw depth data captured by the one or more depth-sensing sensors, wherein the unprocessed raw depth data is descriptive of the scene;
provide the unprocessed raw camera data and the unprocessed raw depth data to a neural network, which is configured to:
assign a first weight to the unprocessed raw camera data and a second weight to the unprocessed raw depth data, based on a weather condition, time of day, or light intensity associated with when the unprocessed raw camera data and the unprocessed raw depth data were respectively captured; and
fuse the unprocessed raw camera data and the unprocessed raw depth data based on the first weight and the second weight,
wherein the neural network is a Siamese neural network, a first subnetwork of the neural network receives the unprocessed raw camera data, and a second subnetwork of the neural network receives the unprocessed raw depth data;
generate a depth map of the scene based on the fusion of the unprocessed raw camera data and the unprocessed raw depth data; and
provide the depth map to the perception stack, wherein the perception stack is configured to detect an object in the scene based on the depth map.

2. The system of claim 1, wherein the unprocessed raw camera data has a first resolution, the unprocessed raw depth data has a second resolution that is lower than the first resolution, and the depth map has a third resolution that is at or above the first resolution.

3. The system of claim 1, wherein the one or more depth-sensing sensors include at least one of an ultrasonic sensor, a radio detection and ranging (RADAR) sensor, and an indirect time-of-flight (ToF) camera sensor.

4. The system of claim 1, wherein providing the unprocessed raw camera data and the unprocessed raw depth data to the neural network includes:
projecting the unprocessed raw depth data onto the unprocessed raw camera data,
wherein the unprocessed raw depth data and the unprocessed raw camera data are provided to the neural network without any prior feature extraction, object detection, labeling, or classification.

5. The system of claim 1, wherein the one or more processors are configured to:
provide the depth map to the perception stack, which is configured to estimate a free space in the scene.

6. The system of claim 1, wherein the camera sensor and the one or more depth-sensing sensors are mounted on an autonomous vehicle.

7. A method comprising:
receiving unprocessed raw camera data captured by a camera sensor, wherein the unprocessed raw camera data is descriptive of a scene;
receiving unprocessed raw depth data captured by one or more depth-sensing sensors, wherein the unprocessed raw depth data is descriptive of the scene;
providing the unprocessed raw camera data and the unprocessed raw depth data to a neural network, which is configured to:
assign a first weight to the unprocessed raw camera data and a second weight to the unprocessed raw depth data, based on a weather condition, time of day, or light intensity associated with when the unprocessed raw camera data and the unprocessed raw depth data were respectively captured; and
fuse the unprocessed raw camera data and the unprocessed raw depth data based on the first weight and the second weight,
wherein the neural network is a Siamese neural network, a first subnetwork of the neural network receives the unprocessed raw camera data, and a second subnetwork of the neural network receives the unprocessed raw depth data;

generating a depth map of the scene based on the fusion of the unprocessed raw camera data and the unprocessed raw depth data;
providing the depth map to a perception stack; and
detecting, by the perception stack, an object in the scene based on the depth map.

8. The method of claim 7, wherein the unprocessed raw camera data has a first resolution, the unprocessed raw depth data has a second resolution that is lower than the first resolution, and the depth map has a third resolution that is at or above the first resolution.

9. The method of claim 7, wherein the one or more depth-sensing sensors include at least one of an ultrasonic sensor, a radio detection and ranging (RADAR) sensor, and an indirect time-of-flight (ToF) camera sensor.

10. The method of claim 7, wherein providing the unprocessed raw camera data and the unprocessed raw depth data to the neural network includes:
projecting the unprocessed raw depth data onto the unprocessed raw camera data,
wherein the unprocessed raw depth data and the unprocessed raw camera data are provided to the neural network without any prior feature extraction, object detection, labeling, or classification.

11. The method of claim 7, further comprising:
providing the depth map to the perception stack, which is configured to estimate a free space in the scene.

12. The method of claim 7, wherein the camera sensor and the one or more depth-sensing sensors are mounted on an autonomous vehicle.

13. A non-transitory computer-readable medium comprising instructions which, when executed by one or more processors, cause the one or more processors to:
receive unprocessed raw camera data captured by a camera sensor, wherein the unprocessed raw camera data is descriptive of a scene;
receive unprocessed raw depth data captured by one or more depth-sensing sensors, wherein the unprocessed raw depth data is descriptive of the scene;
provide the unprocessed raw camera data and the unprocessed raw depth data to a neural network, which is configured to:
assign a first weight to the unprocessed raw camera data and a second weight to the unprocessed raw depth data, based on a weather condition, time of day, or light intensity associated with when the unprocessed raw camera data and the unprocessed raw depth data were respectively captured; and
fuse the unprocessed raw camera data and the unprocessed raw depth data based on the first weight and the second weight,
wherein the neural network is a Siamese neural network, a first subnetwork of the neural network receives the unprocessed raw camera data, and a second subnetwork of the neural network receives the unprocessed raw depth data;
generate a depth map of the scene based on the fusion of the unprocessed raw camera data and the unprocessed raw depth data;
provide the depth map to a perception stack, wherein the perception stack is configured to detect an object in the scene based on the depth map.

14. The non-transitory computer-readable medium of claim 13, wherein the unprocessed raw camera data has a first resolution, the unprocessed raw depth data has a second resolution that is lower than the first resolution, and the depth map has a third resolution that is at or above the first resolution.

15. The non-transitory computer-readable medium of claim 13, wherein the one or more depth-sensing sensors include at least one of an ultrasonic sensor, a radio detection and ranging (RADAR) sensor, and an indirect time-of-flight (ToF) camera sensor.

16. The non-transitory computer-readable medium of claim 13, wherein providing the unprocessed raw camera data and the unprocessed raw depth data to the neural network includes:
projecting the unprocessed raw depth data onto the unprocessed raw camera data,
wherein the unprocessed raw depth data and the unprocessed raw camera data are provided to the neural network without any prior feature extraction, object detection, labeling, or classification.

* * * * *